(12) United States Patent
Stafford et al.

(10) Patent No.: US 10,097,901 B2
(45) Date of Patent: *Oct. 9, 2018

(54) ADDRESSING AND LOCATING IN-LINE COAXIAL CABLE DEVICES WITHIN CUSTOMER PREMISES IN CABLE-BASED NETWORKS

(71) Applicant: Time Warner Cable Enterprises LLC, New York, NY (US)

(72) Inventors: Roger Stafford, Broomfield, CO (US); Dean Osborne, Thornton, CO (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/469,526

(22) Filed: Mar. 25, 2017

(65) Prior Publication Data

US 2017/0201804 A1    Jul. 13, 2017

Related U.S. Application Data

(63) Continuation of application No. 14/594,994, filed on Jan. 12, 2015, now Pat. No. 9,699,507.

(51) Int. Cl.
| | |
|---|---|
| *H04N 7/16* | (2011.01) |
| *H04N 21/61* | (2011.01) |
| *H04L 12/24* | (2006.01) |
| *H04N 21/443* | (2011.01) |
| *H04N 21/436* | (2011.01) |
| *H04N 21/442* | (2011.01) |
| *H04L 12/28* | (2006.01) |

(52) U.S. Cl.
CPC ..... *H04N 21/6118* (2013.01); *H04L 12/2801* (2013.01); *H04L 41/12* (2013.01); *H04N 21/436* (2013.01); *H04N 21/4436* (2013.01); *H04N 21/44227* (2013.01)

(58) Field of Classification Search
None
See application file for complete search history.

(56) References Cited

U.S. PATENT DOCUMENTS

| | | | |
|---|---|---|---|
| 7,792,963 | B2 | 9/2010 | Gould |
| 2006/0130107 | A1 | 6/2006 | Gonder |
| 2006/0239278 | A1 | 10/2006 | Hurst |
| 2007/0217436 | A1 | 9/2007 | Markley |
| 2007/0247311 | A1 | 10/2007 | Muchkaev |

(Continued)

OTHER PUBLICATIONS

Anonymous, Wikipedia, the free encyclopedia, article "DiSEqC," downloaded from http://en.wikipedia.org/wiki/DiSEqC on Jul. 3, 2014, pp. 1-3.

*Primary Examiner* — James R Marandi
(74) *Attorney, Agent, or Firm* — Otterstedt, Ellenbogen & Kammer, LLP

(57) ABSTRACT

An exemplary apparatus for use in a cable-based network includes passive circuitry coupled with an input of the apparatus and configured to generate an output signal having frequency response characteristics controlled as a function of a value of at least one component in the passive circuitry. The apparatus further includes active circuitry coupled with the input of the apparatus. The active circuitry is configured to generate a message signal indicative of a presence of the apparatus in the cable-based network in response to an interrogation signal supplied to the apparatus.

19 Claims, 10 Drawing Sheets

(56) References Cited

U.S. PATENT DOCUMENTS

| | | |
|---|---|---|
| 2008/0013612 A1 | 1/2008 | Miller |
| 2008/0165789 A1 | 7/2008 | Ansari |
| 2009/0248794 A1 | 10/2009 | Helms |
| 2010/0033323 A1 | 2/2010 | Tsai et al. |
| 2010/0125877 A1 | 5/2010 | Wells |
| 2010/0251312 A1 | 9/2010 | Albano |
| 2010/0313236 A1 | 12/2010 | Straub |
| 2011/0194597 A1 | 8/2011 | Wolcott |
| 2011/0280249 A1 | 11/2011 | Shrum |
| 2012/0166783 A1 | 6/2012 | Kamdar |
| 2013/0077634 A1 | 3/2013 | Finkelstein |
| 2013/0134774 A1 | 5/2013 | Kennedy |
| 2013/0278353 A1 | 10/2013 | Alkan |
| 2013/0291029 A1 | 10/2013 | Wells |
| 2014/0153624 A1 | 6/2014 | Wolcott |
| 2014/0177833 A1 | 6/2014 | Helms |
| 2016/0205435 A1 | 7/2016 | Stafford |

ADDRESSING AND LOCATING IN-LINE COAXIAL CABLE DEVICES WITHIN CUSTOMER PREMISES IN CABLE-BASED NETWORKS

CROSS-REFERENCE TO RELATED APPLICATION

This application is a continuation, under 37 CFR 1.53(b), of co-assigned U.S. patent application Ser. No. 14/594,994 of inventors Roger Stafford et al., and claims the benefit thereof, said application Ser. No. 14/594,994 having been filed on 12 Jan. 2015, and entitled " ADDRESSING AND LOCATING IN-LINE COAXIAL CABLE DEVICES WITHIN CUSTOMER PREMISES IN CABLE-BASED NETWORKS." The complete disclosure of the aforesaid application Ser. No. 14/594,994 is expressly incorporated herein by reference in its entirety for all purposes.

FIELD OF THE INVENTION

The present invention relates generally to communications systems and methods, and, more particularly, to cable-based network architectures and the like.

BACKGROUND OF THE INVENTION

Many cable multi-service operators (MSOs) providing data and voice services as well as entertainment services have deployed multimedia over coax alliance (MoCA) networks in commercial and residential applications. MoCA is an industry standard alliance developing technology for enabling the secure and reliable delivery of data, Internet access and high definition (HD) video and content throughout the entire premises. MoCA technology utilizes existing in-home coaxial cabling and works with WiFi® to extend wireless connectivity. Customers can independently purchase MoCA bridges (e.g., through retail outlets) and add them to existing cable and/or satellite coaxial cable-based networks within their homes.

One of the network design requirements for MoCA to work effectively is that a point-of-entry filter be used. A point-of-entry filter is generally employed to prevent the MoCA signal from leaving the premises, due to security and signal ingress concerns, to prevent interference between adjacent subscriber homes that use MoCA technology, to minimize MoCA energy on the cable television feeder, and to create a reflected MoCA signal in the home which increases the MoCA signal level, and hence data rate, within the subscriber's home, among other factors. Typically, a point-of-entry filter is constructed as a small metal cylinder or barrel about one inch in length and about one-half inch in diameter with an F-type mechanical thread at both ends.

One of the drawbacks to using point-of-entry filters, at least from the standpoint of an MSO is that, once installed, these filters tend to be difficult to physically locate. Sometimes the filters are placed on the back of television sets, cable modems, gateways, set-top boxes (STBs), and other customer premises equipment (CPE), or are placed in a subscriber demarcation enclosure on the exterior of the premises, and in some cases are placed in hard to reach locations such as crawl spaces and attics. Thus, since a point-of-entry filter can be connected in any one of numerous locations in a customer network, an issue for an MSO technician returning to a premises to investigate or modify an existing installation (e.g., during a service call) is that the filters are hard to find. This significantly increases the time and cost of a service call and, when a filter is missed on a coaxial cable link, that link cannot be upgraded to become a MoCA link until the filter is found. A viable and cost-effective solution to locating MoCA point-of-entry filters within customer premises has heretofore not been available.

SUMMARY OF THE INVENTION

Principles of the present invention provide techniques for tracking, locating or otherwise identifying in-line coaxial cable devices installed within customer premises and/or network infrastructure, including, but not limited to, electronic filters (e.g., MoCA filters, return path filters, and video bandpass, low-pass or high-pass filters), in-line video, return path or MoCA amplifiers, active or passive splitters, and the like. More particularly, one or more embodiments provide a mechanism for determining the identity and/or presence of an in-line coaxial cable device (e.g., MoCA point-of-entry filters) on a given branch of cable within customer premises and network infrastructure by addressing the device directly using a communications protocol (e.g., one-way or two-way communications). In this manner, embodiments of the invention facilitate tracking, locating or otherwise identifying in-line coaxial cable devices to aid in the debugging and installation of physical cable-based networks.

In one aspect, an exemplary apparatus for use in a cable-based network includes passive circuitry coupled with an input of the apparatus and configured to generate an output signal having frequency response characteristics controlled as a function of a value of at least one component in the passive circuitry. The apparatus further includes active circuitry coupled with the input of the apparatus. The active circuitry is configured to generate a message signal indicative of a presence of the apparatus in the cable-based network in response to an interrogation signal supplied to the apparatus.

In another aspect, an exemplary method for locating an in-line passive coaxial cable device in a cable-based network at a customer premises includes: providing active circuitry integrated with the passive coaxial cable device, the active circuitry being configured to generate and transmit a message signal in response to an interrogation signal received by the active circuitry; injecting the interrogation signal into the cable-based network; and monitoring the cable-based network for a presence of the message signal transmitted by the active circuitry, the message signal indicating a presence of the device in the cable-based network.

As used herein, "facilitating" an action includes performing the action, making the action easier, helping to carry out the action, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

At least a portion of one or more embodiments of the invention, or elements thereof, can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated.

Furthermore, at least a portion of one or more embodiments of the invention or elements thereof can be implemented in the form of an apparatus including a memory and at least one processor that is coupled to the memory and operative to perform, or facilitate performance of, exemplary method steps. Yet further, in another aspect, at least a portion of one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

Ability to track or otherwise locate the presence of a point-of-entry filter within a customer premises and/or network infrastructure;

Ability to identify the type of in-line coaxial device used within a given customer premises;

Ability to track the number of in-line coaxial devices used within a customer premises where more than one device exists;

Ability to determine that no in-line coaxial devices exist in networks where it is important that one should exist;

Ability to determine that a network installation has been performed correctly.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Purely by way of example only and without limitation, embodiments of the invention will be shown in the context of a cable multi-service operator (MSO) providing data and voice services as well as entertainment services. However, one or more embodiments are broadly applicable to any broadband network, non-limiting examples of which include an Internet Protocol (IP) network, fiber-to-the-curb (FTTC) or fiber-to-the-premises (FTTP) network, wireless broadband, and the like. Specifically, one or more embodiments of the invention are directed to a mechanism for tracking, locating or otherwise identifying cable-based network filters, such as, for example, multimedia over coax alliance (MoCA) point-of-entry filters, within customer premises and/or network infrastructure. In one or more aspects, an addressable filter and means for communication therewith are provided for use, for example, in locating or otherwise identifying the filter within a customer premises.

It should be understood, however, that embodiments of the invention are not limited to the system, methods and/or apparatus shown and described herein. Rather, embodiments of the disclosure have broad applicability to a mechanism for tracking, locating or otherwise identifying essentially any passive in-line coaxial device(s). Thus, it will become apparent to those skilled in the art given the teachings herein that numerous modifications can be made to the illustrative embodiments shown that are within the scope of the claimed invention; that is, no limitations with respect to the embodiments shown and described herein are intended or should be inferred.

Figure 1:
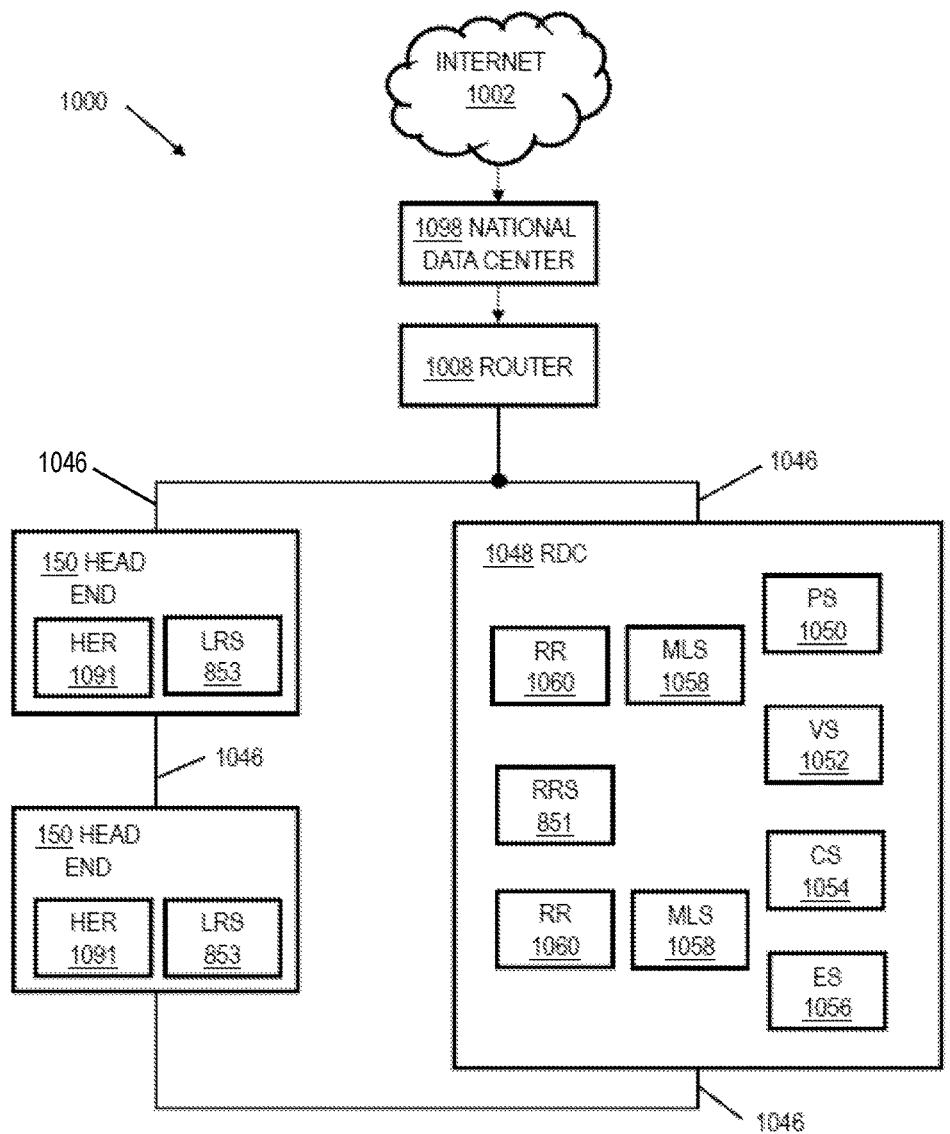
FIG. 1 is a block diagram of an exemplary embodiment of a system, within which one or more aspects of the invention can be implemented.

FIG. 1 is a block diagram depicting at least a portion of an exemplary system 1000, according to an aspect of the invention. System 1000 includes a regional data center (RDC) 1048, and one or more divisions, represented by division head-ends 150. RDC 1048 and head-ends 150 are interconnected by a network 1046; by way of example and not limitation, a dense wavelength division multiplex (DWDM) network. Elements 1048 and 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via a router 1008. In one or more non-limiting exemplary embodiments, router 1008 is a point-of-presence ("POP") router; for example, of the kind available from Juniper Networks, Inc., Sunnyvale, Calif., USA.

Head-ends 150 may each include a head-end router (HER) 1091 which interfaces with network 1046. Head-end routers 1091 are omitted from figures below merely for economy of description. This does not imply that head-end routers 1091 are not present in a commercial implementation of one or more embodiments of the invention.

RDC 1048 may include one or more provisioning servers (PS) 1050, one or more video servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head-ends and/or regional data centers. For example, such an NDC might include one or more video on-demand (VOD) servers; switched digital video (SDV) functionality; gateways to obtain content (e.g., program content) from various sources including cable feeds and/or satellite; and so on.

Figure 2:
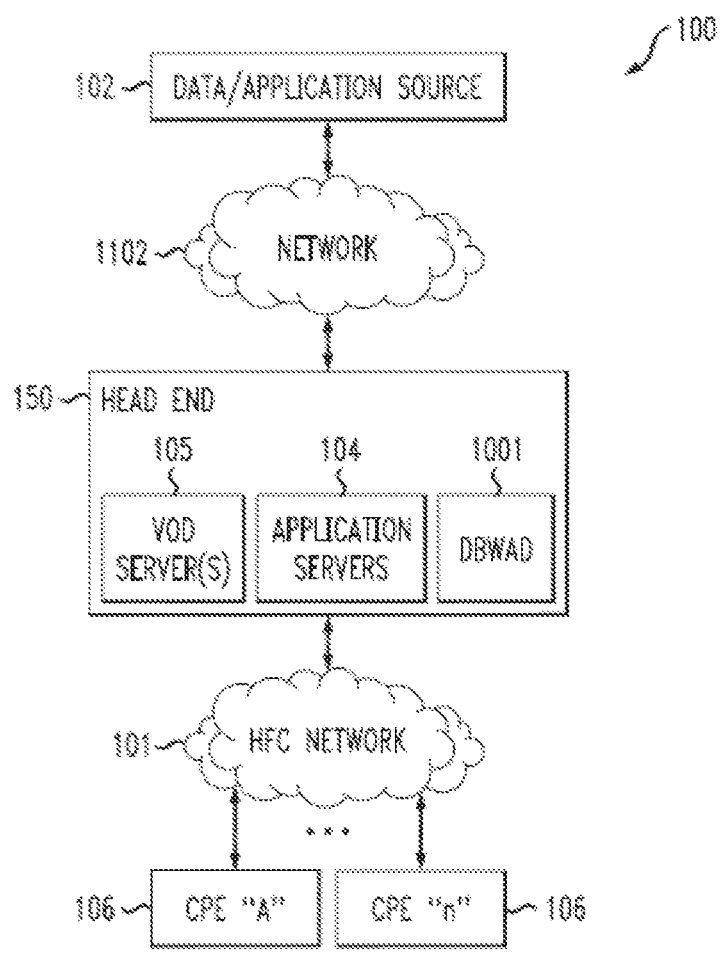
FIG. 2 is a functional block diagram illustrating an exemplary hybrid fiber-coaxial (HFC) divisional network configuration, useful within the system of FIG. 1.

FIG. 2 is a functional block diagram illustrating at least a portion of an exemplary content-based (e.g., hybrid fiber-coaxial (HFC)) divisional network 100, useful within the system of FIG. 1. See, for example, U.S. Patent Application Publication No. 2006/0130107 to Gonder et al., entitled "Method and Apparatus for High Bandwidth Data Transmission in Content-based Networks," the complete disclosure of which is expressly incorporated by reference herein in its entirety for all purposes. The various components of the network 100 include: (i) one or more data and application origination sources 102; (ii) one or more application distribution servers 104; (iii) one or more VOD servers 105; and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head-end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination source 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive/Independent Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination source may be, for example, within NDC 1098, RDC 1048, or on the Internet 1002. Head-end 150, HFC network 101, and CPEs 106 thus represent the divisions which were represented by division head-ends 150 in FIG. 1.

The application distribution server(s) 104 comprises a computer system where such applications can enter the network system. Distribution servers per se are well known in the networking arts, and accordingly will not be described further herein.

The VOD server(s) 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes (STBs), game consoles, IP video streaming boxes, Internet-connected TVs and high-speed cable modems for providing high bandwidth Internet access in premises such as homes and businesses.

Also included (for example, in head-end 150) is a dynamic bandwidth allocation device (DBWAD) 1001 such as a global session resource manager, which is itself a non-limiting example of a session resource manager. U.S. Patent Application Publication No. 2010/0313236 to Albert Straub, entitled "Techniques for Upgrading Software in a Video Content Network," the complete disclosure of which is expressly incorporated herein by reference for all purposes, provides additional details on the aforementioned dynamic bandwidth allocation device 1001.

Figure 3:
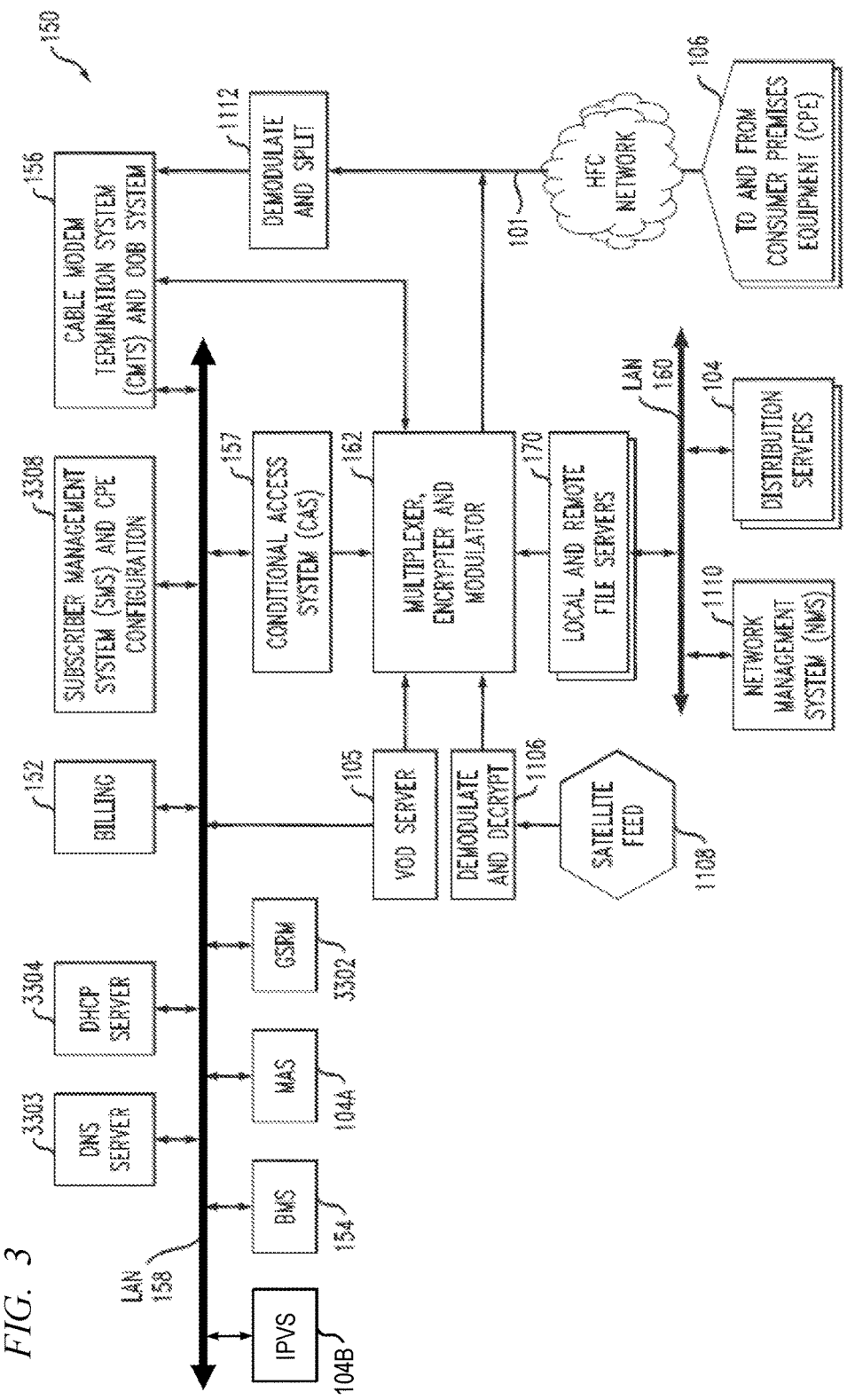
FIG. 3 is a functional block diagram illustrating one exemplary HFC cable network head-end configuration, useful within the system of FIG. 1.

FIG. 3 is a functional block diagram illustrating at least a portion of an exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158 and 160 placing the various components in data communication with one another. In one or more embodiments, there are multiple CMTSs. Each may be coupled to an HER 1091 (FIG. 1), for example. See, e.g., FIGS. 1 and 2 of co-assigned U.S. Pat. No. 7,792,963 to Gould et al., entitled "Method to Block Unauthorized Network Traffic in a Cable Data Network," the complete disclosure of which is expressly incorporated herein by reference in its entirety for all purposes.

It will be appreciated that while a bar or bus LAN topology is illustrated, any number of other network configurations (e.g., ring, star, etc.) may be used consistent with the invention. It will also be appreciated that the head-end configuration depicted in FIG. 3 is a high-level, conceptual architecture and that each MSO may have multiple head-ends deployed using custom architectures.

The head-end architecture 150 of FIG. 3 further includes a multiplexer/encrypter/modulator (MEM) 162 coupled to HFC network 101 and adapted to "condition" content for transmission over the network. The distribution servers 104 are coupled to the LAN 160, which provides access to the MEM 162 and network 101 via one or more local and/or remote file servers 170. VOD server(s) 105 are coupled to the LAN 158, although other architectures may be employed (such as, for example, where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., traditional audio, traditional (as distinguished from Internet Protocol television (IPTV)) video, etc.) is provided in each downstream (in-band) channel associated with the relevant service group. (Note, that in the context of data communications, Internet data is passed both downstream and upstream.) To communicate with the head-end or intermediary node (e.g., hub server), the CPE 106 may use the out-of-band (OOB) or DOCSIS channels and associated protocols (e.g., DOCSIS 1.x, 2.0. or 3.0). The OpenCable™ Application Platform (OCAP) 1.0, 2.0, 3.0 (and subsequent) specification (Cable Television Laboratories Inc.) provides for exemplary networking protocols both downstream and upstream, although the invention is in no way limited to these approaches. All versions of the DOCSIS and OCAP specifications are expressly incorporated herein by reference in their entireties for all purposes. One or more aspects of embodiments of the invention are implemented for IPTV video in, for example, TWC TV®, a registered trademark of Time Warner Inc., applications, although embodiments of the invention are not limited to this implementation.

Furthermore in this regard, DOCSIS is an international telecommunications standard that permits the addition of high-speed data transfer to an existing cable TV (CATV) system. It is employed by many cable television operators to provide Internet access (cable Internet) over their existing HFC infrastructure. Use of DOCSIS to transmit data (including IPTV) on an HFC system is one non-limiting exemplary context associated with one or more embodiments. However, one or more embodiments are generally applicable to IPTV, regardless of what kind of functionality is employed.

It will also be recognized that multiple servers (broadcast, VOD, or otherwise) can be used, and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to MEM block 162. Conditional access system 157 may be provided for access control purposes. Network management system (NMS) 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server (MAS) 104A, Internet Protocol Video Services (IPVS) 104B (an MAS equivalent for TWC TV® applications), and a business management system 154, all of which are coupled to LAN 158. GSRM 3302 is one specific form of a DBWAD 1001 (FIG. 2) and is a non-limiting example of a session resource manager.

An Internet service provider (ISP) domain name system (DNS) server could be located in the head-end 150 as shown at 3303, but it can also be located in a variety of other places. One or more Dynamic Host Configuration Protocol (DHCP) server(s) 3304 can also be located where shown or in different locations.

Figure 4:
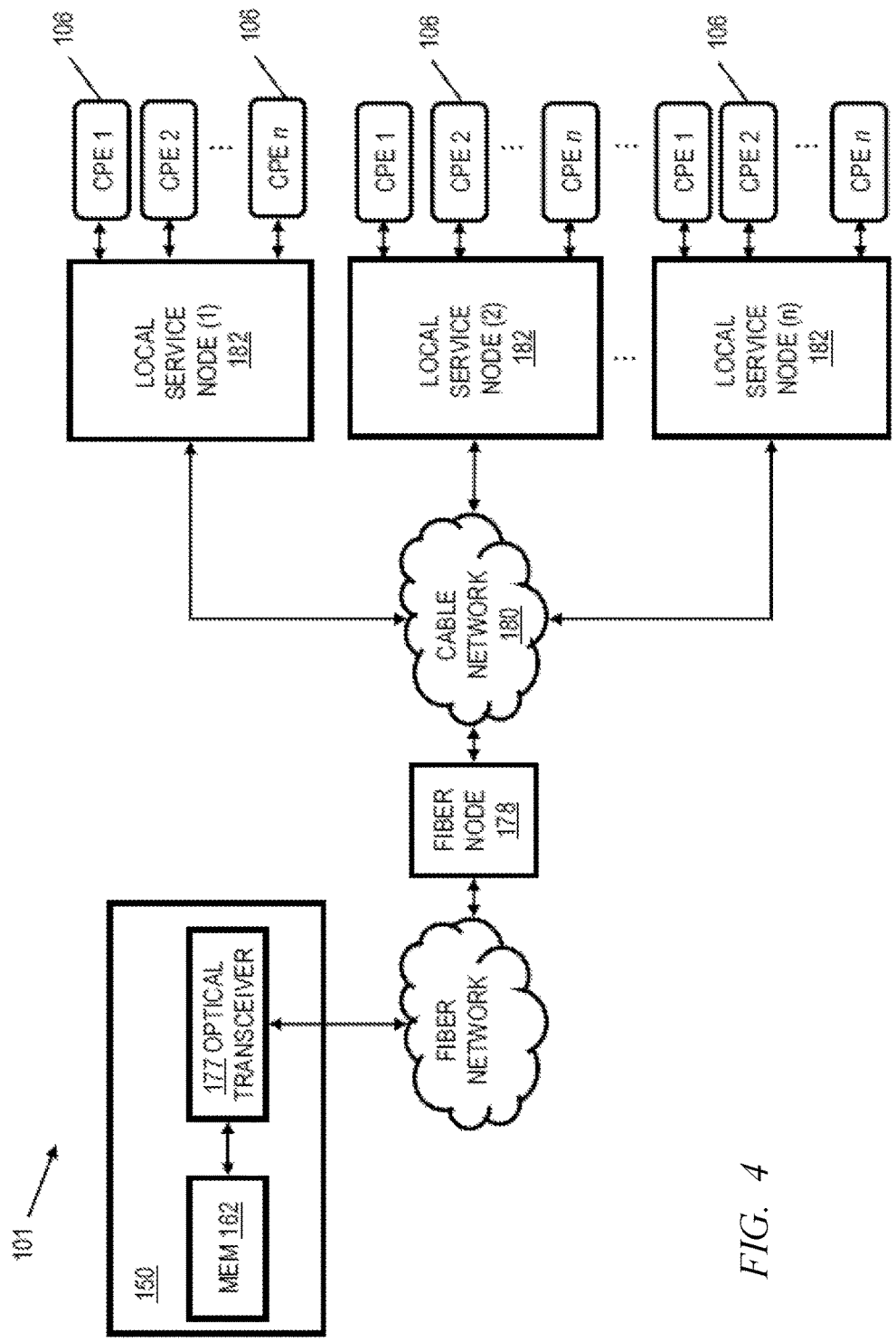
FIG. 4 is a functional block diagram illustrating one exemplary local service node configuration useful within the system of FIG. 1.

As shown in the illustrative embodiment of FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a cable distribution network 180 (typically coax) to a plurality of local servicing nodes 182 (1 through n, where n is an integer indicative of the node number). This provides an effective 1-to-N expansion of the network at the local service end. Each of the nodes 182 services a number of CPEs 106. Further reference may be had to U.S. Patent Application Publication No. 2007/0217436 to Markley et al., entitled "Methods and Apparatus for Centralized Content and Data Delivery," the complete disclosure of which is expressly incorporated herein by reference in its entirety for all purposes. In one or more embodiments, the CPE 106 includes a cable modem, such as a DOCSIS-compliant cable modem (DCCM). Note, that the number of CPEs 106 per node 182 may be different than the number of nodes 182.

U.S. Patent Application Publication No. 2009/0248794 to William L. Helms, entitled "System and Method for Content Sharing," the complete disclosure of which is expressly incorporated herein by reference for all purposes, provides additional details on CPE in the form of a converged premises gateway device. Related aspects are also disclosed in U.S. Patent Application Publication No. 2007/0217436 to Markley et al, entitled "Methods and Apparatus for Centralized Content and Data Delivery," the complete disclosure of which is expressly incorporated herein by reference for all purposes.

Figure 5:
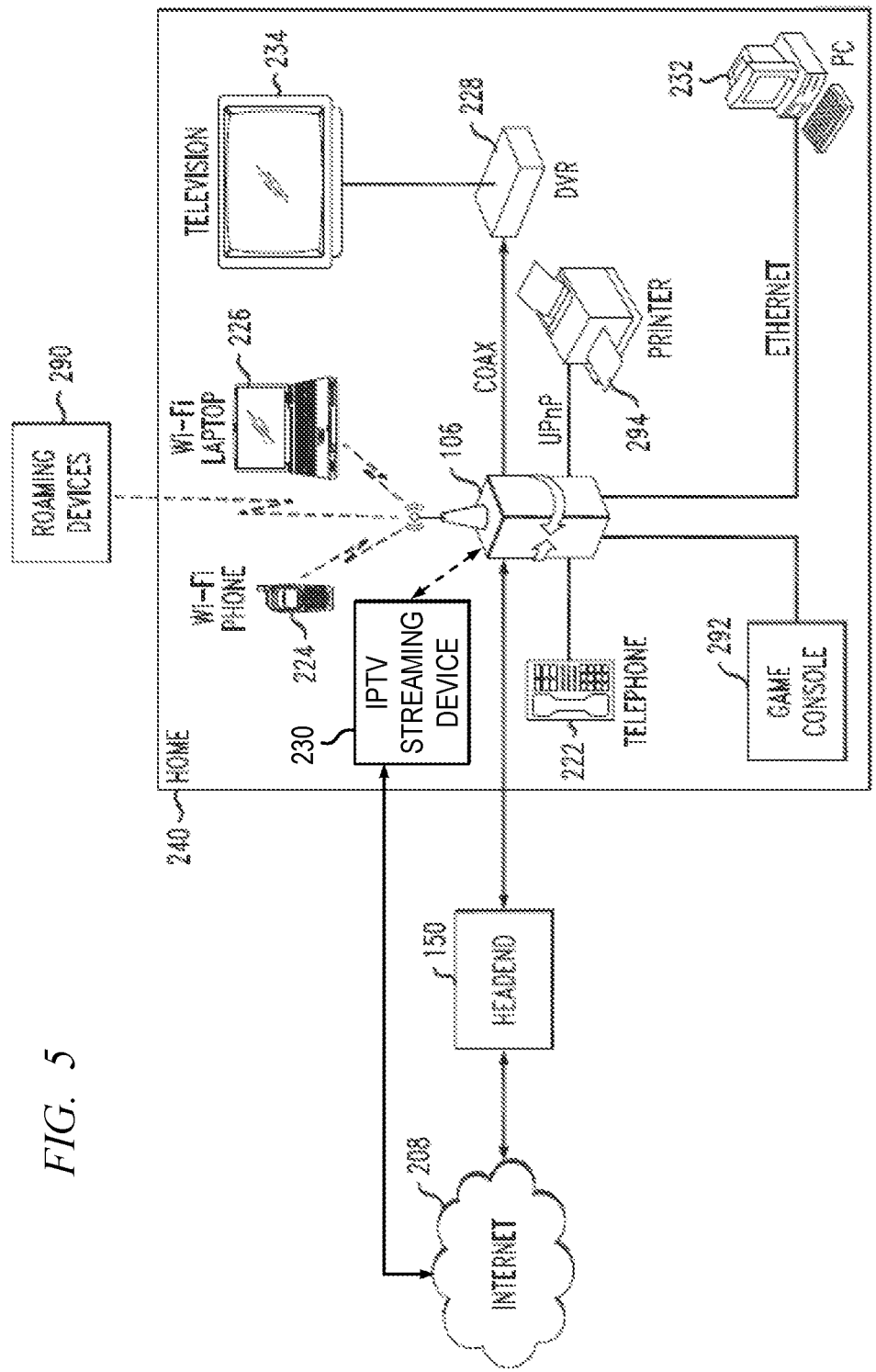
FIG. 5 is a functional block diagram of a premises network, including an exemplary centralized customer premises equipment (CPE) unit, interfacing with a head end such as that of FIG. 3.

Reference should now be had to FIG. 5, which presents a block diagram of a premises network interfacing with a head-end of an MSO or the like, providing Internet access, traditional cable television (QAM) and/or IPTV. An exemplary advanced wireless gateway comprising CPE 106 is depicted as well. It is to be emphasized that the specific form of CPE 106 shown in FIGS. 5, as well as FIG. 6 (described in further detail herein below), is exemplary and non-limiting, and shows a number of optional features. Many other types of CPE can be employed in one or more embodiments; for example, a cable modem, DSL modem, and the like.

In the illustrative embodiment shown in FIG. 5, CPE 106 includes an advanced wireless gateway which connects to a head-end 150 or other hub of a network, such as a video content network of an MSO or the like. The head-end 150 is also coupled to an internet (e.g., the Internet) 208 which is located external to the head-end 150, such as via an Internet (IP) backbone or gateway (not explicitly shown, but implied).

The head-end 150 is, in the illustrated embodiment, coupled to multiple households or other premises, including the exemplary illustrated household 240. In particular, the head-end (for example, a cable modem termination system 156 thereof, as shown in FIG. 3) is coupled via the aforementioned HFC network and local coaxial cable or fiber drop to the premises, including the CPE 106. In FIG. 5, upstream traffic refers to traffic from one or more devices in the home 240 or other premises that is sent upstream from the cable modem (e.g., in CPE 106) to the head end 150 or other upstream node in the network. Likewise, downstream traffic refers to traffic sent downstream from the head end 150 or other upstream node in the network to one or more devices in the home 240 or other downstream node(s) via the cable modem (e.g., in CPE 106).

The exemplary CPE 106 is in signal communication with any number of different devices including, for example, a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, an IPTV streaming device 230 (e.g., Roku, or the like) and/or a game console 292; for example, over a multimedia over coax alliance (MoCA) interface, Ethernet, or other wired or wireless communication connection. Game console 292 is one example of an IPTV streaming device that could be used to watch IPTV in accordance with aspects of the invention. An IPTV streaming device 230 on which one or more embodiments are to be practiced can be connected to the Internet in many ways; an HFC network providing high-speed IP data in addition to traditional video content is merely one non-limiting exemplary embodiment. IPTV streaming device 230, like game console 292, could be connected to CPE 106 by, for example, Ethernet, Wi-Fi, or MoCA (e.g. via a MoCA-to-Ethernet bridge). All types of IPTV streaming devices or game consoles may not necessarily be capable of connection via all of Ethernet, Wi-Fi, and MoCA. Moreover, an IPTV streaming device 230 may, in one or more embodiments, be connected directly with the television 234, either via a wired or wireless connection (not explicitly shown, but implied). Some embodiments employ a Microsoft Xbox console as game console 292. Some embodiments are used only with traditional cable television services or other traditional content delivery services (e.g., fiber optic). Some embodiments that are directed to IPTV involve consumption of IPTV by devices other than, or in addition to, gaming consoles.

In some instances, CPE 106 is also in signal communication with one or more roaming devices, generally represented by block 290. Such roaming devices 290 may reside externally to the home 240.

A "home LAN" (HLAN) is created in the exemplary embodiment, which may include for example the network formed over the installed coaxial cabling in the premises, the Wi-Fi network, and so forth.

During operation, the CPE 106 exchanges signals with the head-end 150 over the interposed coax (and/or other, e.g., fiber) bearer medium. The signals include e.g., IPTV or other Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240. Again, the depicted example is non-limiting; some embodiments are directed only to traditional video delivery (non-IPTV); some embodiments are directed only to IPTV; and some embodiments are directed to both.

Any number of different data flows may occur within the network depicted in FIG. 5. For example, the CPE 106 may exchange digital telephone signals from the head-end which are further exchanged with the telephone unit 222, the Wi-Fi phone 224, or one or more roaming devices 290. The digital telephone signals may be IP-based, such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head-end 150, which is further exchanged with the Wi-Fi laptop 226, the PC 232, one or more roaming devices 290, the gaming console 292, or other device. CPE 106 may also receive digital programming that is forwarded to the DVR 228 or to the television 234. Programming requests and other control information may be received by the CPE 106 and forwarded to the head-end 150 as well for appropriate handling.

Figure 6:
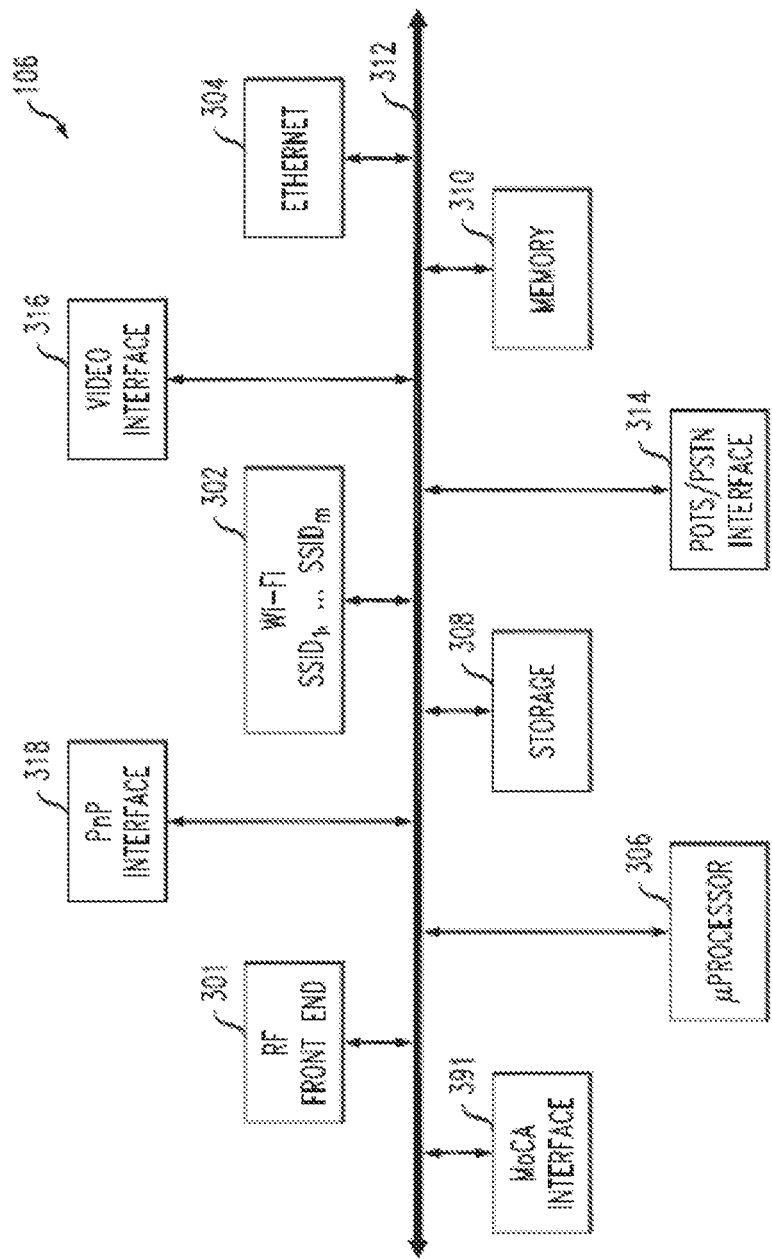
FIG. 6 is a functional block diagram of an exemplary centralized CPE unit, useful within the system of FIG. 1.

FIG. 6 is a block diagram illustrating at least a portion of an exemplary embodiment of the CPE 106 shown in FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled with a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of at least a subset of these applications is on a separate IP subnetwork for security, accounting, and policy reasons. In one or more embodiments, one or more SSIDs can be set aside for the home network while one or more SSIDs can be set aside for roaming devices 290 (FIG. 5). The optional Wi-Fi wireless interface 302 is, in some instances, also configured to provide a plurality of unique SSIDs simultaneously. These SSIDs are configurable (locally or remotely), such as via a web page.

A microprocessor 306, storage unit 308, plain old telephone service (POTS)/public switched telephone network (PSTN) interface 314, and memory unit 310 are also coupled to the bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive/independent disks) configuration, or some combination thereof The illustrated CPE 106 can assume literally any discrete form factor, including those adapted for desktop, floor-standing, or wall-mounted use, or alternatively may be integrated in whole or in part (e.g., on a common functional basis) with other devices if desired.

Again, it is to be emphasized that every embodiment need not necessarily have all of the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, simple "cable box," and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes only, and various other configurations of the CPE 106 are consistent with other embodiments of the invention. For example, the CPE 106 in FIG. 6 may not include all of the elements shown, and/or may include additional elements and interfaces such as, for example, an interface for the HomePlug A/V standard which transmits digital data over power lines, a PAN (e.g., 802.15), Bluetooth, or other short-range wireless interface for localized data communication, etc.

A suitable number of standard 10/100/1000 Base-T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0 or 3.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to Internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g., the Wi-Fi interface 302, Ethernet interface 304, MoCA interface 391, or plug-and-play (PnP) interface 318.

Additionally, the RF front end 301 modulates, encrypts/multiplexes as required, and transmits digital information for receipt by upstream entities such as the CMTS or a network server. This includes upstream commands from the game console 292. In one or more embodiments, the game console 292 does not communicate directly with the RF front end 301; rather, it communicates with the RF front end 301 over Ethernet 304 or Wi-Fi 302. In one or more embodiments that include an Xbox or other game console 292, upstream commands from the Xbox or other game console 292 are sent to the RF front end 301 over Ethernet 304 or Wi-Fi 302 and then upstream into the network, from the RF front end 301, via DOCSIS or the like. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. IPTV devices, PCs, laptops, etc., as well as by roaming devices 290. In addition, the CPE 106 can be remotely managed (such as from the head-end 150, or another remote network agent) to support appropriate IP services.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

A premises gateway software management package (application) is also provided to control, configure, monitor and/or provision the CPE 106 from the cable head-end 150 or other remote network node via the cable modem (DOC- SIS) interface. This control allows a remote user to configure and monitor the CPE 106 and home network.

The MoCA interface 391 is used for delivering data, Internet access and/or high definition (HD) video and content throughout the entire customer premises using existing in-home coaxial cabling. The MoCA interface 391 can be configured, for example, in accordance with the MoCA 1.0, 1.1, or 2.0 specifications. MoCA 1.1 provides 175 Mbit/s net throughputs (275 Mbit/s PHY rate) and operates in the 500 to 1650 MHz frequency range. MoCA 2.0 supports two performance modes, Basic and Enhanced, with 400 Mbit/s and 800 Mbit/s net throughputs (MAC), using 700 Mbit/s and 1.4 Gbit/s PHY rates, respectively. Turbo Mode yields 1 Gbit/s net throughput. The operating frequency range for MoCA 2.0 is 500 to 1650 MHz.

As previously stated, a network design requirement for MoCA to work effectively is that a point-of-entry filter be used. The point-of-entry filter is typically employed in MoCA networks to alleviate security and/or signal ingress concerns (by preventing the MoCA signal from leaving the premises), to prevent interference between adjacent subscriber homes that use MoCA technology, to minimize MoCA energy on the cable feeder, and to create a reflected MoCA signal in the home which increases the MoCA signal level, among other benefits. However, one of the drawbacks to using point-of-entry filters, at least from the standpoint of an MSO is that, once installed, these filters tend to be difficult to physically locate due to the various connection arrangements in which the filters can be utilized (e.g., on the back of television sets, cable modems, gateways, set-top boxes (STBs) and other customer premises equipment (CPE), in a subscriber demarcation enclosure on the exterior of the premises, in crawl spaces and in attics). This undesirably increases the time and cost of a service call and, when a filter is missed on a coaxial cable link, that link cannot be upgraded to become a MoCA link until the filter is found.

In accordance with aspects of the invention, an electronically addressable filter is provided for use in a network (e.g., MoCA network). The filter is configured to generate a message signal or other response indicative of the presence of the filter in the network (e.g., indicating the particular line of network cabling in which the filter is connected) so as to facilitate locating the filter. In one or more embodiments, active circuitry is included in the filter, along with standard passive filter components, that can receive and transmit signals within a command and control spectrum of the network. Hence, in the context of a MoCA network, for example, aspects of the invention provide a point-of-entry filter which, when interrogated, is able to broadcast its presence to the network. In this manner, a filter according to one or more embodiments can be more easily located compared to conventional passive point-of-entry filters and other passive devices which are not detectable other than by tedious manual inspection.

Figure 7:
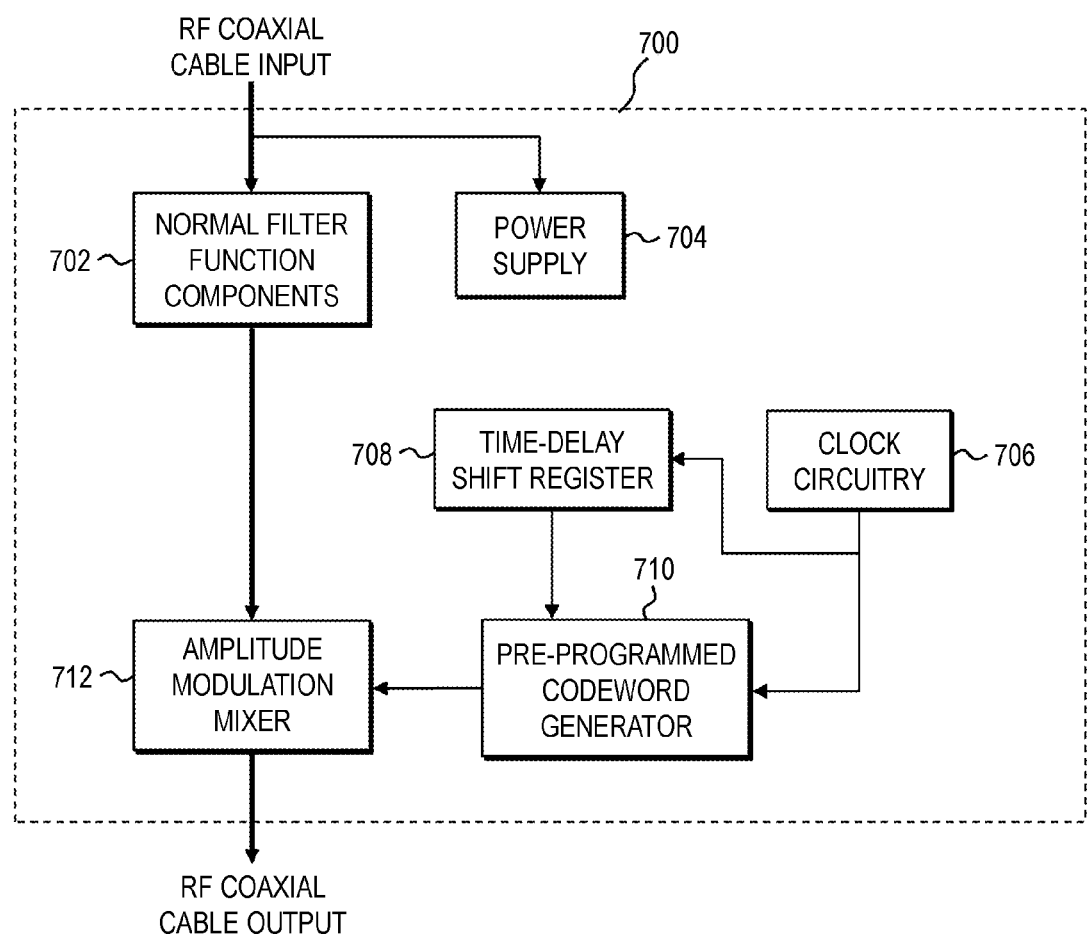
FIG. 7 is a block diagram depicting at least a portion of an exemplary electronically addressable filter suitable for use in a cable-based network infrastructure (e.g., a MoCA network), according to an embodiment of the invention.

FIG. 7 is a block diagram depicting at least a portion of an exemplary electronically addressable filter 700 suitable for use in a cable-based network infrastructure (e.g., a MoCA network), according to an embodiment of the invention. The filter 700 is adapted to receive an input signal, which in this embodiment is conveyed via a radio frequency (RF) coaxial cable input, and to generate an output signal, which in this embodiment is conveyed via an RF coaxial cable output. The filter 700 includes standard passive filter function components 702 (e.g., inductors, capacitors and resistors) coupled with the RF coaxial cable input and operative to receive cable spectrum channels and services signals conveyed by the RF coaxial cable input and to generate a filtered output signal. The frequency response characteristics of the overall filter 700 will be controlled as a function of the connection arrangement (i.e., filter topology; for example, low pass, bandpass or notch) and values of the filter function components 702, as will become apparent to those skilled in the art. It is to be appreciated that embodiments of the invention are not limited to any specific frequency response characteristics or filter topology of the filter 700. The filter function components 702 preferably include a DC blocking circuit (e.g., capacitive coupling) operative to remove any DC component that may be present in the input signal supplied to the filter 700.

The filter 700 further comprises active circuitry, including a receiver and transmitter for responding to command signals (e.g., "ping" signal) via a prescribed communications protocol, memory for storing a unique filter identifier (e.g., MAC address), and a power supply for supplying power to the active circuitry. In the embodiment shown in FIG. 7, the receiver is implemented in a power supply module 704 that is coupled with the RF coaxial cable input. The power supply module 704, in one or more embodiments, is configured to receive a DC signal component in the input signal supplied to the filter 700 and to extract a DC voltage therefrom; that is, the DC signal component is injected into the input signal from an external source. The power supply module 704, in one or more embodiments, may optionally include a voltage regulator for providing a substantially constant DC supply voltage to the remaining active circuitry regardless of variations in the DC voltage level supplied to the filter 700.

In one or more other embodiments, rather than powering the active circuitry directly using the DC voltage extracted from the input signal supplied to the filter 700 via the RF coaxial cable input, an AC signal (e.g., 60 Hz) is injected into the input signal supplied over the RF coaxial cable input. In this scenario, the power supply module 704 includes rectification circuitry (e.g., a rectifier or diode) operative to convert the received AC signal into a DC supply voltage for powering the active circuitry. Rectifier circuits suitable for use in conjunction with one or more embodiments of the invention will be known by those skilled in the art.

The DC signal, or AC signal as the case may be, is externally injected into the cable input signal by an installer or network engineer, for example, as a means of interrogating the filter 700 to respond with an identification message. After providing the power signal to the coaxial network in which the filter 700 is connected, the installer or engineer, using an appropriate detection device, searches for the identification message generated by the filter indicating the presence of the filter on the cable line being investigated. To accomplish this, the active circuitry in the filter 700 further includes clock circuitry 706, a time-delay shift register 708, a codeword generator 710 and an amplitude modulation (AM) mixer 712. The clock circuitry 706, when powered up, is operative to generate a substantially constant clock signal provided to the time-delay shift register 708 and codeword generator 710. The time-delay shift register 708 is adapted to receive the clock signal and to divide the clock signal by a prescribed value (e.g., $2^n$, where n is the number of bits employed in the time-delay shift register) to thereby generate a corresponding delay interval used as a codeword enable signal. This delay interval, in one or more embodiments, assures that not all devices respond at exactly the same time, so that there is no overlap, or at least a substantially reduced likelihood of overlap, in the codeword responses generated by the devices when multiple in-line devices are present in the coaxial network.

In this embodiment, the memory for storing the unique filter identifier is implemented in the codeword generator 710 and the transmitter for responding to command signals is implemented in the AM mixer 712. The codeword generator 710, in one or more embodiments, comprises a shift register that is pre-loaded with a digital codeword indicative of the unique identifier, or other identifying criteria, corresponding to the filter 700. The codeword generator 710 is configured to receive the clock signal and the codeword enable signal and to generate as a function thereof a coded bitstream output signal that comprises the digital codeword modulated by the clock signal. This coded bitstream is supplied to the mixer 712 where it is added to the input signal supplied to the filter 700 to generate the output signal of the filter which is conveyed via the RF coaxial cable output. This modulated codeword output signal, in one or more embodiments, is AC-coupled with the RF coaxial cable output.

In the embodiment shown in FIG. 7, the mixer 712 employs amplitude modulation (AM) as a simple methodology for adding the coded message to the output signal of the filter 700. However, it is to be appreciated that embodiments of the invention are not limited to AM. Rather, alternative modulation schemes may be utilized, such as, for example, frequency modulation (FM), frequency-shift keying (FSK) modulation, phase-shift keying (PSK) modulation, or the like, to achieve a similar result, as will become apparent to those skilled in the art.

Figure 8:
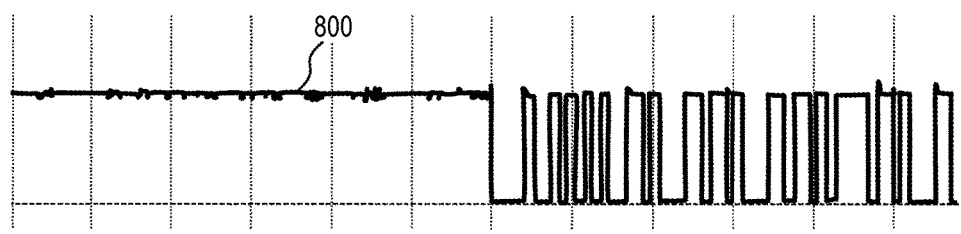
FIG. 8 is a waveform depicting an exemplary coded bitstream generated by a codeword generator in the illustrative filter shown in FIG. 7 over a prescribed period of time, in accordance with an aspect of the invention.
Figure 9:
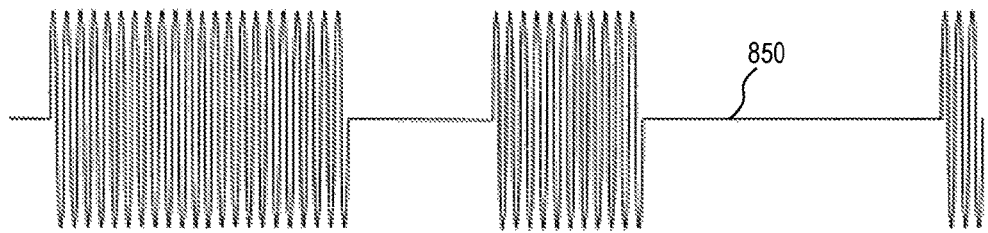
FIG. 9 is a waveform depicting an exemplary modulated codeword output signal generated by the illustrative filter of FIG. 7 over a prescribed period of time, in accordance with an aspect of the invention.

By way of example only and without limitation, assume that the clock signal is a square wave having a frequency of 10 KHz. Furthermore, assume that the time-delay shift register 708 is configured as a 14-bit divider (i.e., n=14), resulting in a division of the clock signal by $2^{14}$ or 16,384. Thus, the codeword enable signal generated by the time-delay shift register 708 will comprise a square wave having a period of about 1.64 seconds (i.e., 10 KHz divided by 16,384). The codeword enable signal initiates the codeword generator 710 to begin generating a coded bitstream output comprising the unique codeword modulated at the clock frequency (10 KHz in this example). It is to be appreciated that embodiments of the invention are not limited to any particular clock frequency and/or division value. FIG. 8 is a waveform 800 depicting at least a portion of an exemplary coded bitstream generated by the codeword generator 710, in accordance with an aspect of the invention. FIG. 9 is a waveform 850 depicting at least a portion of an exemplary modulated codeword output signal generated by the filter 700, in accordance with an aspect of the invention.

In terms of operation of the electronically addressable filter according to one or more embodiments of the invention, the filter 700 will begin transmitting an electronic message (after a slight power-up delay) when power is applied across the RF coaxial cable input from an external source, and will stop transmitting the message when power is removed from the cable and the active circuitry in the filter powers down. The electronic message transmitted by the filter 700, in one or more embodiments, will be indicative of prescribed information for identifying the filter, such as, for example, the type of filter, filter manufacturer, unique identifier (e.g., filter serial number or other unique identification number), and/or other relevant information. An installer or network engineer with an appropriate detection/receiving device is thus able to send a signal to interrogate any filters connected to a given section of the coaxial network being analyzed and to remotely detect the message signal transmitted by the filter(s) (e.g., in a command and control spectrum of the network). Once a message signal is detected, knowing that a filter or filters are present, each filter connected with the given section of cabling can be removed until no more filters respond.

The illustrative filter 700 shown in FIG. 7, once powered up, will begin emitting a serial pulse train, which includes the information used to remotely indicate the presence of the filter (e.g., codeword output signal), within a prescribed amount of time (e.g., about one second). In one or more embodiments, transmission of this pulse train is repeated periodically (e.g., every ten seconds) during a prescribed period of time, such as, for example, about two minutes. After this prescribed period of time has elapsed, the message repetition frequency is preferably decreased (e.g., to once per minute), in one or more embodiments, so as to reduce the possibility of coincident messages being transmitted when more than one filter is present in the coaxial network. The system, in one or more embodiments, relies on an inherent variation in clock frequency from filter to filter, based on a tolerance of each filter, to provide a random delay in response times from each filter.

In one or more other embodiments, the variation in clock frequency of a given filter is controlled (e.g., programmed) within a prescribed range. For example, the value for n in the $2^n$ delay divider of the clock (e.g., in the time-delay shift register 708 shown in FIG. 7) in each of a subset of the filters in the coaxial network can be programmed to a different transmission delay interval. This approach randomizes the timing of message signals sent by the multiple filters and thereby increases the likelihood of detection of the filters by the detection device. It is to be understood that embodiments of the invention are not limited to any specific repetition frequency and/or transmission interval.

Aspects of the invention beneficially eliminate the need for a two-way communications system for detecting the presence of filters in a cable-based network. Specifically, in one or more embodiments, a filter detection device employed, for example, by an installer or network engineer, provides an external DC voltage to the center core of the cable coaxial system and, by doing so, energizes the active circuitry in the filter (e.g., clock circuitry 706, time-delay shift register 708, codeword generator 710 and AM mixer 712 in FIG. 7) such that the filter responds by emitting a serial pulse train identifying the filter to the detection device. An advantage of using this reply-on-power approach is that it simplifies the electronic circuitry, communication protocol and cost of the filter. Moreover, the one-way messaging topology reduces the complexity and cost of the receiver incorporated in the filter. For example, the exemplary filter 700 shown in FIG. 7 can be implemented without the need for a microprocessor and accompanying overhead circuitry, although one or more embodiments recognize that one or more functions of the filter 700 can be performed using a small and low-cost microprocessor or microcontroller where each of the same functional blocks still exists but are performed largely in software.

As previously described, the illustrative filter embodiment shown in FIG. 7 is configured to receive voltage directly from a remotely-applied power signal. In accordance with one or more other embodiments of the invention, the supply voltage for powering the active identification circuitry in the filter is included in the filter itself, such as, for example, from a battery or other DC voltage source.

Figure 10:
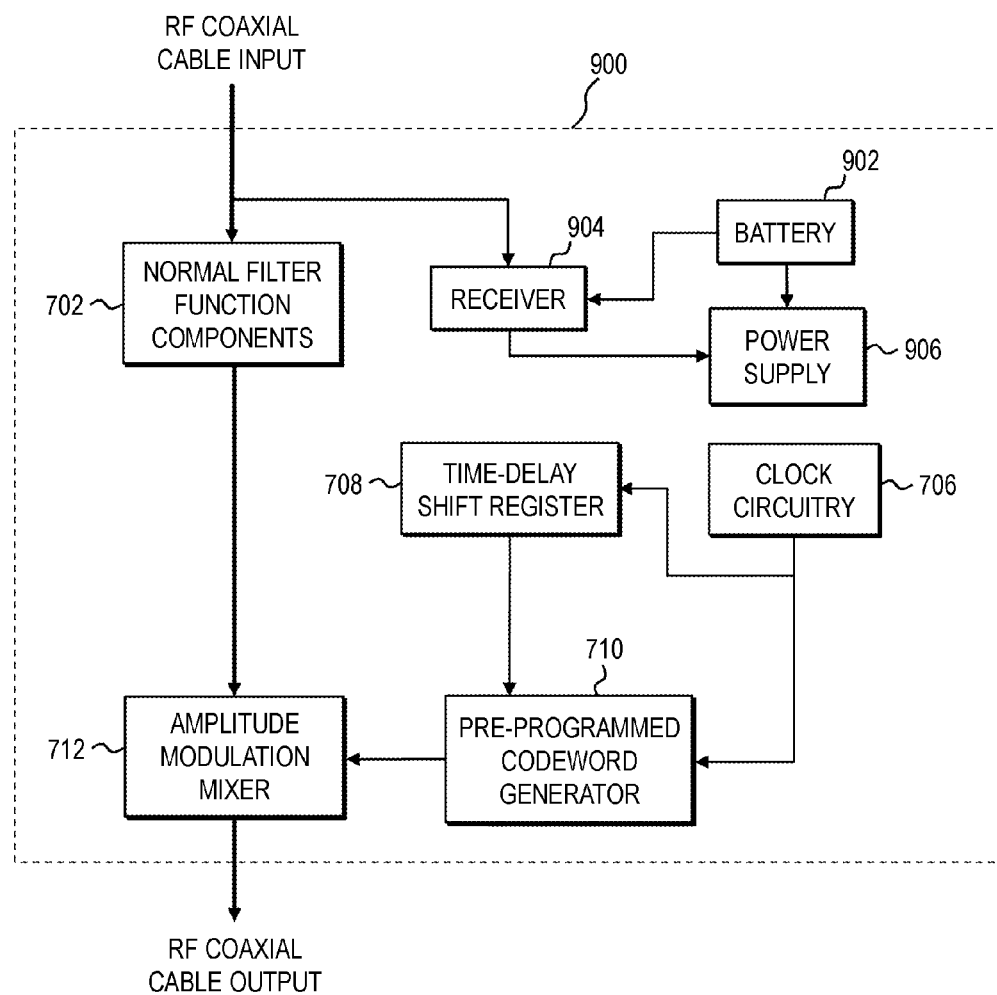
FIG. 10 is a block diagram depicting at least a portion of an exemplary electronically addressable filter suitable for use in a cable-based network infrastructure, according to another embodiment of the invention.

FIG. 10 is a block diagram depicting at least a portion of an exemplary electronically addressable filter 900 suitable for use in a cable-based network infrastructure (e.g., MoCA network), according to another embodiment of the invention. The filter 900, like the illustrative filter 700 shown in FIG. 7, includes passive filter function components 702 (e.g., capacitors, inductors and/or resistors) for controlling the frequency response characteristics of the filter, and active circuitry (e.g., clock circuitry 706, time-delay shift register 708, codeword generator 710 and AM mixer 712) for generating a message signal indicating a presence of the filter in the cable-based network in which the filter is connected.

The filter 700 shown in FIG. 7 does not include an internal voltage source for powering the active circuitry therein; rather, the voltage is extracted from an externally-supplied power signal, as previously described. By contrast, the exemplary filter 900 shown in FIG. 10, in one or more embodiments, includes an internal DC voltage source, such as a battery 902, for powering the active circuitry therein, and therefore does not require power to be supplied externally. In order to conserve battery power, the filter 900 is configured to place most of the active circuitry into a sleep or power-down mode of operation until required for transmitting a message signal indicating a presence of the filter in the network.

Filter 900 includes a receiver 904 and a power supply module 906. The receiver 904 is coupled with the RF coaxial cable input and remains powered up in order to monitor, continuously or periodically, the input signal supplied to the filter 900 for the presence of an interrogation signal from an installer or the like. A receiver 904 configured to perform continuous monitoring of the input signal would provide a faster response time, in terms of powering up the remaining active circuitry and transmitting a message signal, compared to monitoring the input signal at prescribed intervals, but at the expense of reduced battery life.

In one or more embodiments, when the receiver 904 detects a filter interrogation signal (e.g., a ping signal or the like) applied, for example, in a command and control spectrum of the input signal, the receiver is configured to send a power-up control signal to the power supply module 906. The power supply module 906, in response to receiving the power-up control signal, energizes (i.e., powers up) the remaining active circuitry in the filter 900 (e.g., clock circuitry 706, time-delay shift register 708, codeword generator 710 and mixer 712). Once powered-up, the active circuitry begins transmitting a message signal indicating the location and/or identity of the filter 900 in the network, as previously described in conjunction with FIG. 7.

The power supply module 906, in one or more embodiments, includes a controllable switch or other switching circuitry which is configured to connect the battery 902 with a voltage supply bus in the filter 900 (not explicitly shown, but implied), which provides power to the remaining active circuitry in the filter, in response to the power-up control signal. The power supply module 906 will keep the remaining active circuitry energized for as long as the power-up control signal remains active or, in one or more other embodiments, for a prescribed period of time after receiving the power-up control signal, after which the power supply will disconnect the battery from the voltage supply bus causing the active circuitry to power-down once again and enter into sleep mode. To accomplish this, the power supply module 906 may, in one or more embodiments, include timing circuitry configured to track the amount of time that has elapsed since receiving the power-up control signal; timing circuitry suitable for implementing this time-tracking function will become readily apparent to those skilled in the art. In either case, the active circuitry in the filter 900 preferably remains energized long enough for the identification message to be detected by the installer or network engineer initiating the filter interrogation signal.

It is to be understood that, although shown as separate functional modules in FIG. 10, one or more modules may be combined to form a new module which incorporates the functions of the combined modules. Likewise, one or more modules may be integrated within an existing module which then incorporates the functions of the integrated modules. For example, the battery 902 and receiver 904 can, in one or more embodiments, be integrated into the power supply module 906, so as to implement a power supply module that includes its own DC voltage source and being operatively configured to monitor the input signal supplied to the filter 900 for the filter interrogation signal.

In one or more embodiments, the filter 900 is configured to periodically monitor its battery voltage level. When the battery voltage level falls below a prescribed threshold value, the filter is preferably configured to send out a low-battery warning signal indicating that the battery needs replacement soon. This low-battery warning signal is preferably able to be remotely detected, such as by cable installers or the like.

Figure 11:
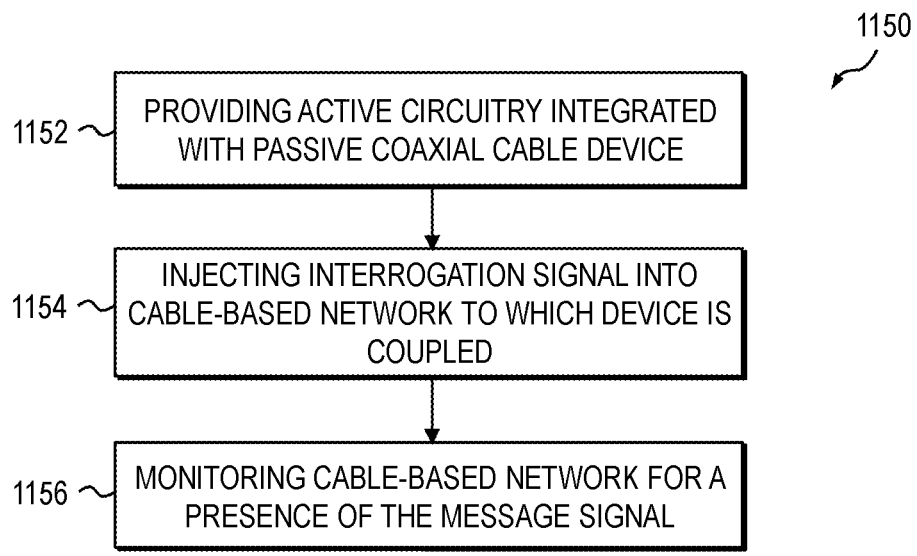
FIG. 11 is a flow diagram depicting at least a portion of an exemplary method for locating an in-line passive coaxial cable device in a cable-based network at a customer premises, according to an embodiment of the invention.

With reference now to FIG. 11, a flow diagram is shown depicting at least a portion of an exemplary method 1150 for locating an in-line passive coaxial cable device in a cable-based network at a customer premises, according to an embodiment of the invention. The method 1150 includes providing active circuitry (e.g., power supply 704, clock circuitry 706, time-delay shift register 708, pre-programmed codeword generator 710 and mixer 712 shown in FIG. 7) integrated with the passive coaxial cable device (e.g., normal filter function components 702 shown in FIG. 7), as shown in step 1152. As previously explained herein, for example in conjunction with FIGS. 7 and 10, the active circuitry is configured to generate and transmit a message signal in response to an interrogation signal received by the active circuitry.

As per step 1154, the method 1150 further includes injecting the interrogation signal into the cable-based network. As previously described, the interrogation signal may, in one or more embodiments, comprise a voltage signal which is extracted by the active circuitry (e.g., power supply 704 shown in FIG. 7) and used to power up one or more other functional modules in the active circuitry (e.g., clock circuitry 706, time-delay shift register 708, pre-programmed codeword generator 710 and mixer 712 shown in FIG. 7). The method 1150 further includes monitoring, in step 1156, the cable-based network for a presence of the message signal transmitted by the active circuitry, the message signal indicating a presence of the device in the cable-based network.

System and Article of Manufacture Details

The invention can employ hardware aspects or a combination of hardware and software aspects. Software includes but is not limited to firmware, resident software, microcode, etc. At least a portion of one or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, at least a portion of one or more embodiments of the invention or elements thereof can be implemented in the form of an apparatus including a memory and at least one processor that is coupled to the memory and operative to perform, or facilitate performance of, exemplary method steps.

Yet further, in another aspect, at least a portion of one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 12:
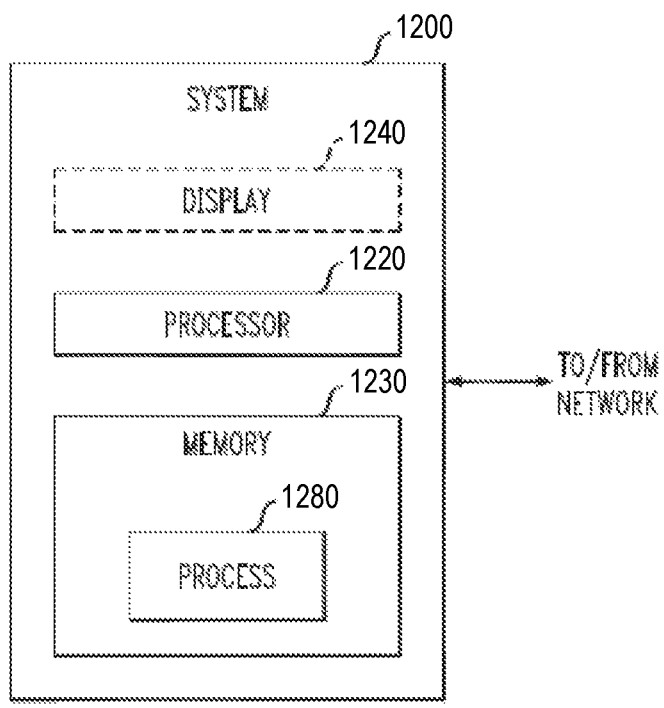
FIG. 12 is a block diagram of at least a portion of an exemplary system that can be configured to implement at least some aspects of the invention.

FIG. 12 is a block diagram of at least a portion of an exemplary system 1200 that can be configured to implement at least some aspects of the invention, and is representative, for example, of one or more of the servers shown in the figures. As shown in FIG. 12, memory 1230 configures the processor 1220 to implement one or more methods, steps, and functions (collectively, shown as process 1280 in FIG. 12). The memory 1230 could be distributed or local and the processor 1220 could be distributed or singular. Different steps could be carried out by different processors.

The memory 1230 could be implemented as an electrical, magnetic or optical memory, or any combination of these or other types of storage devices. It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware—an ASIC chip could be used to initiate the fusible link blowout. Display 1240 is representative of a variety of possible input/output devices (e.g., keyboards, mice, and the like). Every processor may not have a display, keyboard, mouse or the like associated with it.

As is known in the art, at least a portion of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1200 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that at least a portion of one or more embodiments of the invention can include a computer program comprising computer program code means adapted to perform one or all of the steps of any methods or claims set forth herein when such program is run, for example, on a cable modem or other CPE and the like, and that such program may be embodied on a tangible computer readable recordable storage medium. For example, firmware that executes on a cable modem or other CPE is used to control the blowing of the fusible links; such firmware may be upgraded on the cable modem or other CPE from the head end. As used herein, including the claims, unless it is unambiguously apparent from the context that only server software is being referred to, a "server" includes a physical data processing system (for example, system 1200 as shown in FIG. 12) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures and/or described herein. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that at least a portion of one or more embodiments of the invention can include a computer program including computer program code means adapted to perform one or all of the steps of any methods or claims set forth herein when such program is implemented on a processor, and that such program may be embodied on a tangible computer readable recordable storage medium. Further, at least a portion of one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An in-line coaxial cable apparatus for use in a cable-based network, the apparatus comprising:
passive circuitry coupled in-line with the cable-based network, an input of the apparatus and the passive circuitry being configured to receive an input signal from the cable-based network and to generate an output signal having frequency response characteristics controlled as a function of a value of at least one component in the passive circuitry; and
active circuitry coupled with an input of the apparatus, the active circuitry being configured to generate a message signal conveyed over the cable-based network, the message signal being indicative of a presence of the apparatus in the cable-based network in response to an interrogation signal supplied to the apparatus.

2. The apparatus of claim 1, wherein the passive circuitry comprises at least one filter configured to generate the output signal of the apparatus, the frequency response characteristics of the output signal being controlled as a function of at least one of a topology of the filter and a value of at least one component in the filter.

3. The apparatus of claim 1, wherein the passive circuitry is AC-coupled with the input of the apparatus and the active circuitry is directly coupled with the input of the apparatus.

4. The apparatus of claim 1, wherein the active circuitry comprises a power supply module coupled with the input of the apparatus, the power supply module being configured to receive a control signal and to generate a supply voltage for powering one or more functional modules in the active circuitry.

5. The apparatus of claim 4, wherein the power supply module is configured to extract a voltage signal from the interrogation signal supplied to the apparatus and to generate from the voltage signal the supply voltage for powering the one or more functional modules in the active circuitry.

6. The apparatus of claim 4, wherein the active circuitry further comprises:
clock circuitry configured to generate a clock signal;
a codeword generator configured to receive the clock signal and to generate a coded bitstream comprising the message signal indicative of the presence of the apparatus in the cable-based network; and
a mixer coupled with an output of the apparatus and configured to combine the message signal with the output signal generated by the passive circuitry to form the output of the apparatus.

7. The apparatus of claim 1, wherein the active circuitry comprises:
a receiver coupled with the input of the apparatus, the receiver being configured to monitor an input signal supplied to the apparatus and to generate a control signal in response to receiving the interrogation signal;
a power supply module configured to receive the control signal and to selectively energize at least a subset of circuits in the active circuitry as a function of the control signal;
clock circuitry configured to generate a clock signal;
a codeword generator configured to receive the clock signal and to generate a coded bitstream comprising the message signal indicative of the presence of the apparatus in the cable-based network; and
a mixer coupled with an output of the apparatus and configured to combine the message signal with the output signal generated by the passive circuitry in forming the output of the apparatus.

8. The apparatus of claim 7, wherein the power supply module is configured to selectively energize the clock circuitry, the codeword generator and the mixer as a function of the control signal.

9. The apparatus of claim 7, wherein the power supply module comprises a battery and switching circuitry, the switching circuitry being configured to selectively connect the battery with the clock circuitry, the codeword generator and the mixer as a function of the control signal.

10. The apparatus of claim 9, wherein the power supply module is configured to transmit a low-battery warning signal when a voltage level of the battery falls below a prescribed threshold value.

11. The apparatus of claim 7, wherein the mixer is configured to combine the message signal with the output signal using modulation.

12. The apparatus of claim 11, wherein the modulation used by the mixer to combine the message signal with the output signal comprises at least one of amplitude modulation, frequency modulation, frequency-shift keying modulation and phase-shift keying modulation.

13. The apparatus of claim 7, wherein the receiver remains powered on to at least periodically monitor the input signal for a presence of the interrogation signal.

14. The apparatus of claim 7, wherein the active circuitry further comprises a time-delay shift register coupled with the clock circuitry and the codeword generator, the time-delay shift register being adapted to receive the clock signal and to divide the clock signal by a prescribed value to thereby generate a corresponding delay interval used to enable the codeword generator, the delay interval reducing a likelihood of overlap in codeword responses generated by the apparatus when multiple in-line coaxial cable apparatuses are employed in the cable-based network.

15. The apparatus of claim 1, wherein the message signal generated by the active circuitry comprises at least one of a unique identifier corresponding to the apparatus and a type of the apparatus.

16. The apparatus of claim 15, wherein the active circuitry comprises:
clock circuitry configured to generate a clock signal;
a codeword generator configured to receive the clock signal and to generate a coded bitstream comprising the message signal indicative of the presence of the apparatus in the cable-based network; and
a mixer coupled with an output of the apparatus and configured to combine the message signal with the output signal generated by the passive circuitry to form the output of the apparatus;
wherein the codeword generator comprises a shift register that is pre-loaded with a digital codeword indicative of the unique identifier corresponding to the apparatus.

17. The apparatus of claim 1, wherein the active circuitry, in response to receiving the interrogation signal supplied to the apparatus, is configured to repeatedly transmit the message signal in intervals, a timing of the intervals varying within a range according to a prescribed tolerance of the active circuitry.

18. The apparatus of claim 17, wherein the active circuitry comprises a programmable register adapted to store a delay value, a time interval between successive transmissions of the message signal by the apparatus being controlled as a function of the delay value.

19. The apparatus of claim 1, wherein the passive circuitry comprises a multimedia over coax alliance (MoCA) point-of-entry filter.

\* \* \* \* \*